Patented Sept. 19, 1950

2,522,687

UNITED STATES PATENT OFFICE 2,522,687

MANUFACTURE OF HYDROCARBON HALIDES

Frank L. Padgitt and George F. Kirby, Baton Rouge, La., assignors to Ethyl Corporation, New York, N. Y., a corporation of Delaware No Drawing. Application February 26, 1948, Serial No. 11,323

6 Claims. (Cl. 260—663)

This invention relates to the manufacture of halogenated hydrocarbons. It is particularly concerned with a new catalyst for use in the manufacture of these compounds.

An object of the invention is to provide new catalysts for the addition of hydrogen halides to unsaturated acyclic hydrocarbons, including alkene, alkyne, and alkadiene unsaturated compounds. A specific object is to carry out these hydrohalogenation reactions with fewer side reactions and longer catalyst life than heretofore possible.

The addition of hydrogen halides to unsaturated acyclic hydrocarbons is a well known type of reaction. Hydrogen chloride is most commonly combined with the hydrocarbon, but the other hydrogen halides are similarly used. The reactions are usually carried out in the presence of an aluminum halide catalyst, especially aluminum chloride. The present commercial processes are unsatisfactory in several respects. The aluminum halide used is a strong chemical, and promotes or takes part in side reactions. For this reason production of the desired compound is usually accompanied by the formation of undesired polymeric materials. These waste by-products are currently discarded. Although such by-products contain useful chemical materials, the quantities produced are not great enough to justify expenditure on equipment for recovery and separation operations. The quantity produced is, however, great enough to be a real disadvantage of the process. The by-product materials represent losses in the aluminum halide catalyst, unsaturated hydrocarbon, and hydrogen halide. The disposal of the by-products is a further expense, including the cost of operation and investment in tanks, special burners, etc. For these reasons, the present processes are not satisfactory.

The present invention can be used to make many useful compounds by the addition of hydrogen halides to acyclic compounds containing one or more unsaturated carbon-to-carbon linkages. Thus, the method is applicable to reaction of hydrogen halides with alkenes, alkynes, and alkadienes. Typical reactions are the hydrohalogenation of alkenes, such as ethylene, propylene, butylene, and the like, to make the corresponding halides. By using our catalyst, hydrogen halides can be added to hydrocarbons of the acetylene series, such as acetylene, propyne, butyne, and the like. More specifically, hydrogen halides can be added to acetylene to make vinyl halides, or by further reaction, dihaloethanes. Also, by practicing our invention, partially or completely halogenated alkadienes can be produced from diolefins, such as propadiene, butadiene, pentadiene, and the like. For example, monohalobutenes or dihalobutanes can be made by the addition of a hydrogen halide to butadiene.

Various hydrogen halides can be used as starting materials. Hydrogen chloride is the most important compound because of its low cost and the usefulness of the chlorohydrocarbons. However, the other hydrogen halides—hydrogen bromide, hydrogen fluoride, and hydrogen iodide—can be used.

The trichloride, trifluoride, tribromide or triiodide of gallium are used as catalysts. The catalyst preferably corresponds in halogen content to the hydrogen halide used. Thus, gallium trichloride is usually employed when hydrogen chloride is a feed material. However, the catalyst does not necessarily correspond to the hydrogen halide. For example, gallium tribromide can be used when hydrogen chloride is fed. It is believed in such instances that the catalyst and the hydrogen halide will interact and exchange halogen contents until the catalyst halogen content corresponds to the hydrogen halide fed.

In carrying out the process, the unsaturated acyclic hydrocarbon and hydrogen halide are brought together in the presence of the gallium trihalide. One suitable method of contacting the feeds in the presence of a catalyst is to premix them and introduce them into a flooded reactor containing a catalytic amount of gallium trihalide. The reactor contains a liquid inert to the reactants, preferably a liquid product of the reaction, if the product is a completely saturated compound. If the desired product is itself unsaturated, for example, as in partial hydrohalogenation of alkynes or alkadienes, other suitable inert liquids include alkane hydrocarbons and saturated halogenated hydrocarbons. In other words, the inert liquid should be a hydrocarbon or a substituted hydrocarbon having no unsaturated carbon-to-carbon linkage.

Another method for carrying out our invention is to use vapor phase technique, avoiding the presence of liquids. In this method, the gallium trihalide catalyst is preferably supported on an inert carrier solid. The gaseous feed materials are contacted with the catalyst mass under such conditions that the products are released in vapor or gas phase. Suitable support materials are alumina, silica gel, activated carbon, or chamotte. In general, any porous solid material will be suitable providing that it is not reactive to the feed materials. The gallium trihalide can be deposited by known techniques on the support material selected. For example, the trihalide can be deposited by vaporizing or subliming and then condensing on the support material.

The above two methods are suitable especially when the hydrocarbon feed is gaseous at the operating conditions. When the hydrocarbon is a liquid at operating conditions, it can be fed as such, and the hydrogen halide passed through the liquid. The desired product in these instances is usually recovered by distillation of the reactor liquid, with recycling of the unreacted hydrocarbon.

The conditions of operation are not critical and the selection of suitable conditions depends on the charging material, the catalyst used, and the method of operation. Thus, in the vapor phase reaction of ethylene and hydrogen bromide, the temperature of operation is preferably maintained above 38.0 degrees centigrade, the atmospheric boiling point of the product. If the process is carried out above atmospheric pressure, the temperature must be correspondingly increased.

When the reaction is operated as a mixed phase or liquid phase operation, the temperature and pressure conditions are selected such that the desired liquid phase is maintained. In general, it is advantageous to operate all hydrohalogenation reactions at elevated pressure because of the decrease in volume encountered. The range of pressures normally employed is from atmospheric to 20 atmospheres pressure. Temperatures of −30 degrees centigrade to 100 degrees centigrade are usually employed with temperatures from −10 degrees centigrade to −20 degrees centigrade being preferred for liquid phase operations.

A specific and commercially important embodiment of the invention is the manufacture of ethyl chloride. In typical experimental production of ethyl chloride, ethylene gas and hydrogen chloride gas were premixed, in the ethylene to hydrogen chloride mole ratio of 0.91 to 1.0. The premixed feeds were then introduced into the bottom of a reaction cylinder maintained at about −20 degrees centigrade. The reaction vessel contained a solution of gallium trichloride in ethyl chloride. In bubbling up through the reactor solution, the hydrogen chloride and ethylene combined to make ethyl chloride. Conversions of ethylene to ethyl chloride of 85 per cent or better were obtained using 0.15 gram of gallium trichloride in 100 grams of ethyl chloride liquid. Near theoretical yields can be attained by increase of reactor volume. No side reactions occurred, the ethyl chloride produced being free of detectable impurities.

As mentioned above, no by-product formation has been detected in the ethylene-hydrogen chloride reaction as carried out above. In contrast, when aluminum chloride is used under the same conditions, the catalyst solution soon contains one to two per cent high boiling polymeric materials. In addition, the effective life of the gallium trichloride is at least fifty per cent greater than the effective life of aluminum chloride.

It is understood that the examples given herein are merely illustrative of our invention, but do not limit the scope thereof.

We claim:

1. The process of contacting an unsaturated acyclic hydrocarbon with a hydrogen halide in the presence of a gallium trihalide.

2. The process of reacting an unsaturated, acyclic hydrocarbon with a hydrogen halide comprising contacting the hydrocarbon and hydrogen halide in the presence of an inert liquid containing a dissolved, catalytic amount of a gallium trihalide.

3. The process of making alkyl halides comprising contacting an olefin and a hydrogen halide in the presence of a gallium trihalide.

4. The process of making ethyl chloride comprising contacting gaseous ethylene and hydrogen chloride in the presence of gallium trichloride.

5. The process of making ethyl chloride comprising contacting gaseous ethylene and hydrogen chloride in the presence of liquid ethyl chloride containing a catalytic amount of gallium trichloride.

6. The process of making ethyl chloride comprising contacting gaseous ethylene and hydrogen chloride in the proportion of at least 0.90 mole of ethylene to one mole of hydrogen chloride at pressures above atmospheric and at a temperature between minus 10 degrees and minus 20 degrees centigrade with liquid ethyl chloride containing a catalytic amount of gallium trichloride dissolved in ethyl chloride liquid.

FRANK L. PADGITT.
GEORGE F. KIRBY.

REFERENCES CITED

The following references are of record in the file of this patent:

UNITED STATES PATENTS

| Number | Name | Date |
|---|---|---|
| 2,103,692 | Piotrowski et al. | Dec. 28, 1937 |
| 2,407,039 | Stanley | Sept. 3, 1946 |

FOREIGN PATENTS

| Number | Country | Date |
|---|---|---|
| 435,858 | Great Britain | Oct. 1, 1935 |

OTHER REFERENCES

Berkman et al.: "Catalysis," pages 293–4.

Ulich et al.: "Z. Elektrochem.," vol. 41, pages 509–14 (1935); vol. 49, pages 292–6 (1943).

Ulich et al.: "Oel u. Kohle in Gemeinschaft mit Brennstoff–Chem.," vol. 39, pages 523–7 (1943).